United States Patent [19]
Boertzel et al.

[11] Patent Number: 4,855,858
[45] Date of Patent: Aug. 8, 1989

[54] POWER REGULATOR WITH OVERCURRENT PROTECTION

[75] Inventors: Martin Boertzel, Tuebingen; Reinhold Ludwig, Herrenberg; Wilhelm Schmits, Holzgerlingen; Ulrich Weiss, Aidlingen, all of Fed. Rep. of Germany

[73] Assignee: International Business Machines Corporation, Armonk, N.Y.

[21] Appl. No.: 142,304

[22] Filed: Dec. 29, 1987

Related U.S. Application Data

[63] Continuation of Ser. No. 651,487, Sep. 17, 1984, abandoned.

[30] Foreign Application Priority Data

Sep. 15, 1983 [EP]  European Pat. Off. ........ 83109122.8

[51] Int. Cl.$^4$ .............................................. H02H 7/10
[52] U.S. Cl. ........................................ 361/18; 361/97; 363/56; 363/25
[58] Field of Search ................ 361/18, 26, 55, 56, 361/97, 93, 96; 363/50, 53, 55, 56, 57, 25, 26

[56] References Cited

U.S. PATENT DOCUMENTS

| | | | |
|---|---|---|---|
| 3,838,329 | 9/1974 | Michelet et al. | 363/25 |
| 3,859,583 | 1/1975 | Reed | 321/2 |
| 3,859,586 | 1/1975 | Wadlington | 363/56 |
| 3,873,903 | 3/1975 | Koetsch et al. | 321/2 |
| 4,002,963 | 1/1977 | Hunter | 363/56 X |
| 4,013,925 | 3/1977 | Tice et al. | 361/18 |
| 4,045,887 | 9/1977 | Nowell | 361/18 X |
| 4,058,758 | 11/1977 | Peterson | 363/25 X |
| 4,148,097 | 4/1979 | Deisch | 363/26 |
| 4,174,496 | 11/1979 | McFall et al. | 361/97 X |
| 4,204,266 | 5/1980 | Kammiller et al. | 363/26 X |
| 4,253,138 | 2/1981 | Shelly et al. | 363/56 |
| 4,293,902 | 10/1981 | White | 363/26 |
| 4,307,441 | 12/1981 | Bello | 363/97 |
| 4,330,816 | 5/1982 | Imazeki et al. | 363/26 |
| 4,346,341 | 8/1982 | Blackburn et al. | 361/18 X |
| 4,383,293 | 5/1983 | Randall | 363/25 |
| 4,456,949 | 6/1984 | Incledon | 363/26 |
| 4,456,950 | 6/1984 | Cordy, Jr. | 363/56 X |
| 4,477,867 | 10/1984 | Pellegrino | 363/56 X |
| 4,480,297 | 10/1984 | Chetty et al. | 363/56 |
| 4,484,256 | 11/1984 | Hartman | 363/26 |
| 4,561,047 | 12/1985 | DePuy | 363/56 |
| 4,570,199 | 2/1986 | Morishita et al. | 361/18 |
| 4,626,954 | 12/1986 | Damiano et al. | 361/96 |

FOREIGN PATENT DOCUMENTS 2505642  6/1977  Fed. Rep. of Germany .

OTHER PUBLICATIONS

IBM Technical Disclosure Bulletin, vol. 25, No. 6, Nov. 1982, W. Hemena, "Current Balance in Push-Pull Inverter (Chopper)".

*Primary Examiner*—A. D. Pellinen
*Assistant Examiner*—A. Jonathan Wysocki
*Attorney, Agent, or Firm*—Robert L. Troike; Frederick D. Poag

[57] ABSTRACT

A regulator includes a switching transformer (TR) whose primary winding is divided into two halves through which current flows alternatingly via one respective switching transistor (Q1, Q2). The pulses on the secondary side of the transformer are rectified to attain the output voltage. The output voltage is controlled by pulse width modulated driver pulses for the two switching transistors. A protective circuit (12) with immediate effect terminates the currently applied driver pulse when the current flowing through the conductive switching transistor reaches a critical current value. A protective circuit (14) with delay effect prevents the generation of further driver pulses upon a further increased overload, this prevention being limited with respect to time. The protective system directly is controlled by the primary current of the power regulator.

9 Claims, 6 Drawing Sheets

POWER REGULATOR WITH OVERCURRENT PROTECTION

This is a continuation of application Ser. No. 651,487 filed Sept. 17, 1984, now abandoned.

BACKGROUND OF THE INVENTION

1. Field of the Invention

The invention relates to a push-pull power regulator with a circuit protecting the switching transistors of the power regulator against current overload.

In such a power regulator known from German Published Application No. 23 38 538 a resistance of a relatively low value is included in the circuit in series to the load, where a correspondingly high voltage drops in cases of current overload. The voltage drop at the resistance is compared with a reference voltage, and if a predetermined threshold value is reached the feeding voltage of the power regulator is switched off via a relay. This arrangement has various disadvantages. Since in the first place the transistors are to be protected against overcurrent, with the current, however, being measured at the secondary side of the power regulator transformer, the effect achieved is only indirect and delayed. If there is an excessive overload, this can destroy the transistors. The insertion of a series resistor to the load unfavorably increases the internal resistance of the power regulator, and besides the current measuring at the secondary side of the transformer rather than at the primary side can create additional error sources.

Another disadvantage of this known power regulator is that the working range of output current and output voltage is dimensioned for a specific use and is relatively narrow, and that outside this range specific regulator circuits for current or voltage, respectively, have to be provided.

The current overload protection used in this known device furthermore does not come up to actual requirements, since the regulator would switch off also in case of one single short term overload. Such a short term overload does not necessarily represent a risk for the transistors, so the protective circuit should be able to tolerate it.

Other known protective circuits for push-pull power regulators refer to the prevention of simultaneous current conduct through the two transistors, since in such an overlapped conducting time the transformer does not establish a magnetic field, and since consequently the current flowing through the transistors would increase in excess of the permissible maximum limit (IBM Technical Disclosure Bulletin, December, 1981, pp. 3887-3888), and to the prevention of asymmetrical current conduct through the two switching transistors (IBM Technical Disclosure Bulletin, November 1982, pp. 2765-2766).

IBM Technical Disclosure Bulletin, April 1981, pp. 4994-4995) describes a switching regulator with an overload-protected individual transistor. The protective circuit permits the time-limitation of individual pulse-width modulated driver pulses as well as the switching-off of the regulator in case of a continuous overload. The switching-off is based on the characteristic of the control loop in the regulator according to which with a decreasing output voltage the error signal used to control the pulse width modulator is increasing. This error signal is directed via a low-pass filter, and the application of further driver pulses to the switching transistor is prevented when the error signal had been on a high amplitude for a long time. The disadvantage of this kind of using the error signal to switch off the regulator is that it is not the actual risky quantity, i.e. the current through the transistor, which is used to switch off the regulator but an undervoltage at the output of the regulator. The overload protection circuit can act on the individual driver pulses only during each switching cycle. As owing to the charge storage period of the transistor the conductive period of the switching transistor cannot pass beneath a certain limit there is the risk, in spite of the protective circuit, of the transistor being destroyed. Another disadvantage of using the error signal to switch off the regulator is that part of the upper region of this error signal cannot be utilized for conventional control since switching is effected from a specific value, and since a predetermined safety distance to this value has to be observed.

IBM Technical Disclosure Bulletin, October 1981, pp. 2435-2436 also refers to an overcurrent protection in a power regulator with separate switching transistor. In this regulator, too, the current through each individual switching transistor is utilized to limit, if necessary, the pulse width modulated driver pulses. Out of the unlimited pulse width modulated driver pulse, and the possibly limited one, a differential signal is generated which after integration can be used to switch off the control oscillator. On principle, the disadvantages of this circuit are therefore the same as described in connection with the preceding circuit. Another common feature of these circuits is that no devices are provided which permit a re-start after a switching-off of the power regulator, with the negative consequence that the regulator will be switched off for a short-term and possibly unimpairing overload as well as for an overload extending over a longer period.

SUMMARY OF THE INVENTION

It is therefore an object of the present invention to provide a protective circuit directly controlled by the current through the switching transistors to prevent a current overload in a power regulator of the above specified type, which reacts separately to a short term or to a long term overload, and which also considers the degree of overload.

This object is achieved in accordance with the invention by providing a protective system, with a protective circuit with immediate effect for the instant switching-off of a switching transistor driver pulse in the event of an overload occurring due to a critical current value being reached by the switching transistor currently being activated, with a protective circuit with delay effect to prevent the generation of further driver pulses after the appearance of an increased overload, and in that the protective system is controlled by the emitter current flowing through the respectively conductive switching transistor.

The advantage of the protective circuit as disclosed by the invention is that in case of a minor and short term overload the power regulator is not immediately switched off. In fact, the circuit reacts to such an overload only by a reduction of the driver pulse duration. Due to the charge storage time of the switching transistors a minimum conductive period of the transistors cannot be reduced any further. If the power regulator overload continues, the switching transistors would be destroyed in spite of an extreme reduction of the driver pulse duration. In that event, the circuit as disclosed by the invention offers protection, too, since the protective circuit effects with delay a total switching-off of the driver pulses when an excess overload is reached. According to the invention, the threshold values for the immediate and the delayed effect can be fixed separately, with the immediate effect however being the first to occur.

Since the protective circuit is directly controlled by the actual current through the respective conductive switching transistor a protection that is as direct as possible to ensured. Failure of components between the switching transistor and the output of the power regulator can thus not be the reason for a defective or non-occurring switching-off of the regulator. Since the protective effect can occur in each switching period, i.e. separately for each individual switching transistor the load on the two transistors will be symmetrical, for if the critical current limit is reached by a switching transistor the latter's conductive period will be terminated, and the conductive period of the other switching transistor in the following switching cycles will be extended instead by the control loop, as far as this, the other switching transistor has not yet reached the critical current level. According to an advantageous embodiment of the invention, the provision of a time limit for the prevention of driver pulses being produced permits a re-start of the power regulator. If the overload still exists upon re-starting, the regulator is switched off again, with a total switching-off being effected by suitable diagnostic means if the re-start has been repeated several times without success.

Further advantageous developments of the invention are specified in the subclaims.

BRIEF DESCRIPTION OF THE DRAWINGS

Two embodiments of the invention will now be discussed with reference to the figures which represent the following.

DETAILED DESCRIPTION

Figure 1:
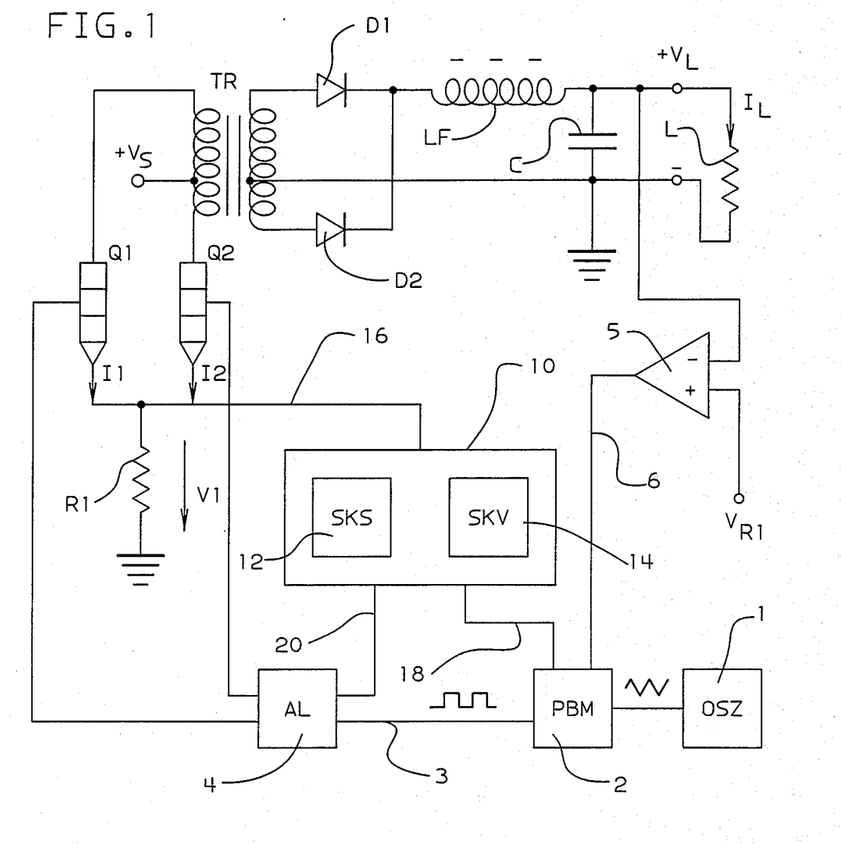
FIG. 1 represents a block circuit diagram of a push-pull power regulator with an overload protective circuit.

FIG. 1 depicts a push-pull power regulator which out of a positive feeding voltage $V_S$ generates a positive supply voltage $V_L$ to supply a load L. The feeding voltage $V_S$ is applied in the middle of the primary winding of a transformer TR. Two high power switching transistors Q1 and Q2 can connect the feeding voltage via one respective half of the primary winding to ground. The transformed switching pulses are rectified by two rectifier diodes D1 and D2, and via the filter element consisting of inductivity LF and capacitor C, supply voltage $V_L$ is obtained. The center tapping of the secondary winding is connected to ground. The driver pulses for controlling the base electrodes of switching transistors Q1 and Q2 are derived by an oscillator 1 which generates a triangle or a sawtooth voltage that is applied to a pulse width modulator 2. Pulse width modulator 2 is controlled via an operational amplifier 5 which compares supply voltage $V_L$ to a reference voltage $V_{R1}$, and applies the resulting error signal on line 6 to pulse width modulator 2. The pulse width modulator control pulses at the output of pulse width modulator 2 on line 3 are applied to a driver circuit 4 that applies the driver pulses in successive switching cycles alternatingly to switching transistors Q1 and Q2. The emitter electrodes of these two switching transistors Q1 and Q2 are interconnected, and the respective emitter current I1 and I2, respectively, is connected to ground (0 Volt) via a low measuring resistor R1 designed as a joint emitter resistor.

In such a power regulator, the two switching transistors have to be protected against current overloads. For that purpose, the invention provides a protective system 10 operating with two different time constants. A protective circuit 12 with immediate effect terminates a pulse width modulated driver pulse as soon as the current through the actually controlled switching transistor reaches a critical threshold value. A protective circuit 14 with delay effect is activated when current pulses are measured which compared with the critical value represent a still further increased load. The pulse currents flowing in the primary winding of transformer TR generate at the joint emitter resistor R1 a voltage drop which via line 16 is applied to protective system 10 to control protective circuits 12 and 14. Protective system 10, on the other hand, is connected via lines 18 and 20 to pulse width modulator 2 and driver circuit 4 to act on the driver pulses, and deactivates, upon its becoming effective, the control of voltage $V_L$.

Figure 2:
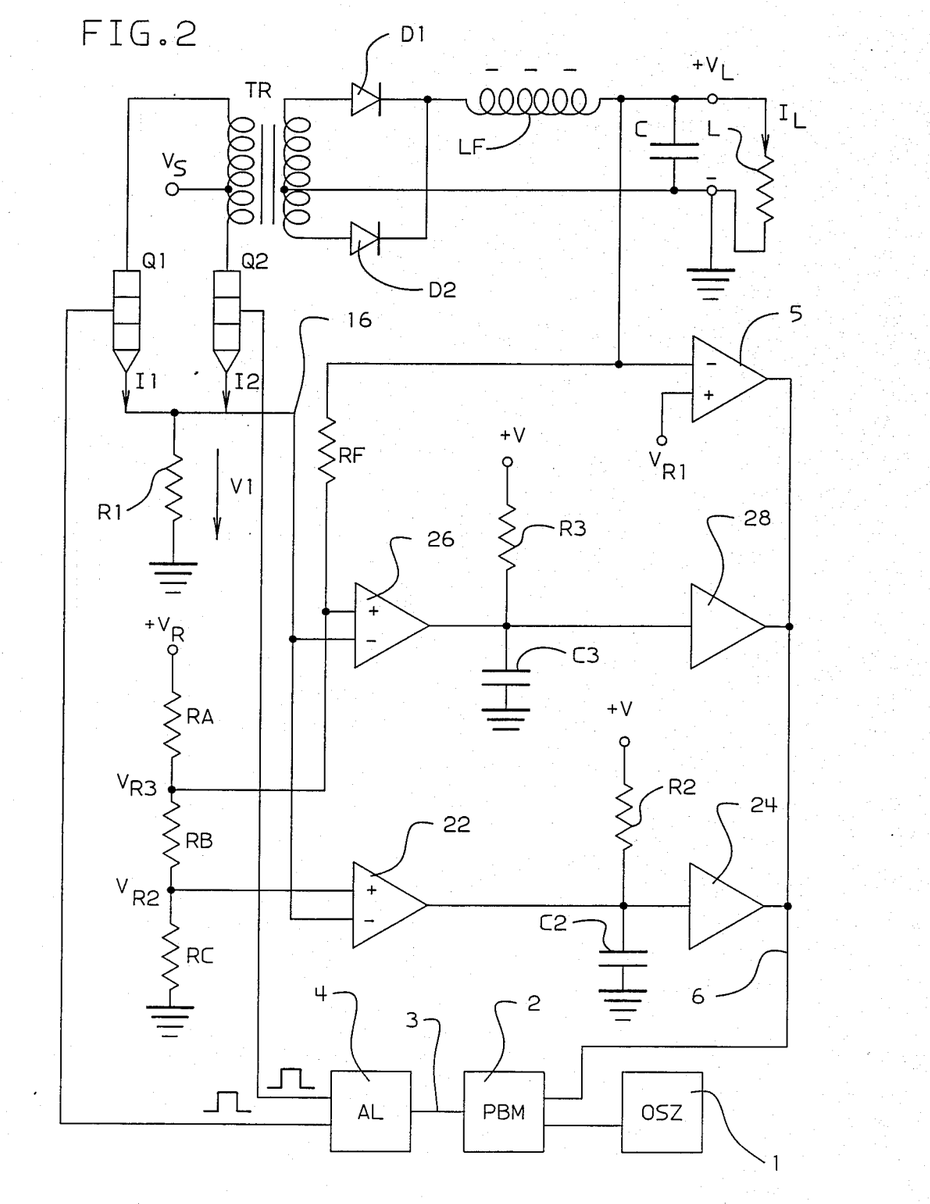
FIG. 2 represents a first embodiment of the protective circuit.

FIG. 2 represents a first embodiment of the invention. Protective circuit 12 with immediate effect comprises a comparator 22 whose output is connected via separating amplifier 24 to line 6, and via a resistor R2 to a positive voltage $+V$ and a capacitor C2 to ground.

Protective circuit 14 with delay effect comprises a comparator 26 whose output is connected via a separating amplifier 28 to line 6, and via a resistor R3 to voltage $+V$ and a capacitor C3 to ground. C2 and C3 are fully loaded when the power regulator operates without overload, and are then without any influence on the control of supply voltage $V_L$ through units 5 and 2. Voltage V1 dropping at resistor R1 through currents I1 and I2 is respectively applied to the inverting inputs of comparators 22 and 26. The non-inverting inputs of these comparators are connected to a reference voltage $V_{R2}$ or $V_{R3}$, respectively, which are obtained from a constant voltage $+V_R$ via a voltage divider $R_A$, $R_B$, $R_C$. Reference voltage $V_{R2}$ is connected to the non-inverting input of comparator 22, and reference voltage $V_{R3}$ is connected to the non-inverting input of comparator 26. $V_{R3}$ is higher than $V_{R2}$.

Comparators 22 and 26 have an output stage with open collector. Consequently, a positive output potential is applied in a very high ohmic mode, but the ground potential with a very low ohmic mode to the two capacitors C2 and C3.

Operational amplifier 5 preferably comprises a short circuit-proof output stage with a relatively high output resistance.

In the following, the operation of protective system 10 will be described in detail with reference to FIGS. 3 to 5.

Figure 3:
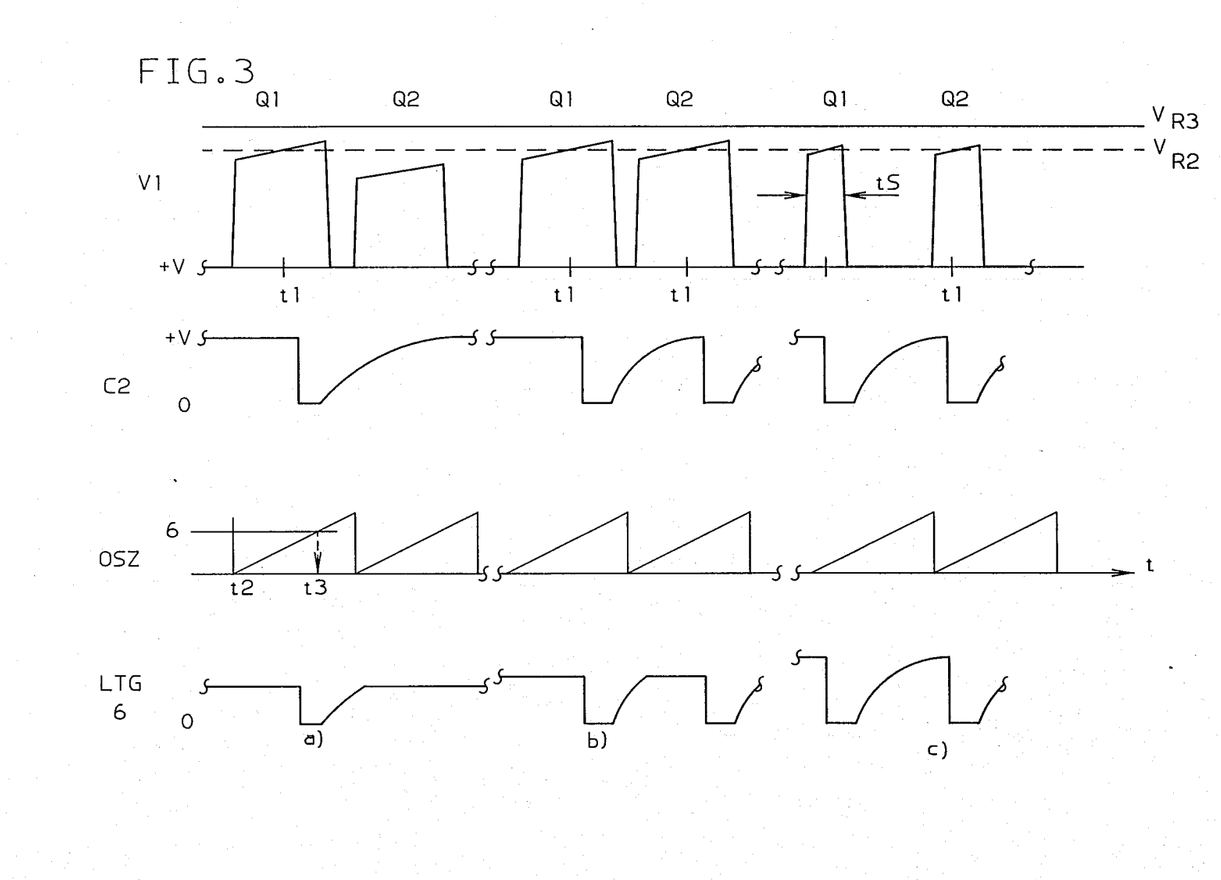
FIG. 3 represents, with reference to FIG. 2, the time development of various signals with a low regulator overload.

FIG. 3 depicts, from top to bottom, four different voltages: voltage V1 dropping at resistor R1, the voltage at capacitor C2, the sawtooth output voltage of oscillator 1, and the voltage on line 6. As specified in FIG. 3 at the bottom, the signals for three different cases (a), (b) and (c) are represented which appear when the resistance of load L is continuously reduced.

Case (a)

In the present case it is assumed that owing to an increasing load switching transistor Q1 is already slightly overloaded while owing to inevitable asymmetries transistor Q2 can still carry an increasing current load.

As indicated in the top line of FIG. 3, voltage V1 reaches at time t1 reference voltage $V_{R2}$; i.e., at time time V1 equals a critical current $I_c$ multiplied by R1 ($V_{R1}=I_c \cdot R1$). When V1 reaches reference voltage $V_{R2}$, comparator 22 changes its state so that its output potential decreases toward zero, and capacitor C2 is discharged with a low time constant. This is represented in line 2 of FIG. 3. Via separating amplifier 24, the potential on line 6 is decreased, too (last line FIG. 3). Owing to the charge storage time of switching transistor Q1, Q1 continues to be conductive for a short period, as specified in FIG. 3. Subsequently, current I1 decreases, so that voltage V1 decreases, too, and the output of comparator 22 becomes positive again. Thus, capacitor C2 can get charged via resistor R2. Time constant R2·C2 is selected in such a manner that the charging of C2 within one switching cycle can be effected, at least to such an extent that pulse width modulator 2 can again supply control pulses. On the other hand, time constant R2·C2 is not so low that within the switching cycle a control pulse could again be supplied to the base electrode, i.e. that a "double pulse" would occur within one switching cycle. Switching circuit 12 with immediate effect comprising RC member R2·C2 thus operates in such a manner that the standard pulse width regulation by the error signal of operation amplifier 5 is eliminated, and that instead pulse width modulator 2 is down-controlled in such a manner that no driver pulse is generated any longer.

The pulse width control of pulse width modulator 2 is indicated in the third line from above in FIG. 3 for the first switching cycle. The error signal on line 6 is compared with the sawtooth produced by oscillator 1. The pulse width modulated control pulse begins with the trailing edge at time t2, and ends at time t3 on which the error signal on line 6 of the sawtooth voltage becomes equal. Therefore, the more the potential on line 6 decreases the narrower are the driver pulses produced. Accordingly, supply voltage $V_L$ is applied to the inverting input of operational amplifier 5. The time between two successive edges of the sawtooth will in the following be called switching period, or switching cycle, respectively.

In the following cycle it is assumed that V1 does not reach value $V_{R2}$, i.e. that transistor Q2 is not overloaded. So in this switching cycle the pulse width is controlled via the error signal on line 6, and capacitor C2 can continue being loaded.

It is furthermore evident from case (a) that the protective circuit as disclosed by the invention effects a symmetrical distribution of the charge of the two switching transistors Q1 and Q2, for if current $I_L$ rises, which also causes an increase of current I1, this increase can only continue to the critical threshold value. Upon reaching this threshold value Q1 is switched off, as described above. If $I_L$ has still to be increased, the current in Q2 must be higher in the following cycle. Again, this increase can only continue up to the threshold, i.e. the critical current level $I_c = V_{R2}/R1$. An overload on one of the switching transistors because for reaching a predetermined load current $I_L$ one of the switching transistors always causes an excessive current while the other causes a much lower one, is consequently avoided in that for each transistor only one predetermined current is admitted. If the control circuit should necessitate a further increase of current $I_L$, that switching transistor which not yet conducts the admissible maximum current is more heavily activated, i.e. activated with a broader and if necessary higher driver pulse.

Case (b)

This case represents a situation where owing to a still increasing load both emitter currents I1 and I2 reach critical value $I_c$. When the current flowing through Q1 reaches the critical value, C2 is discharged quickly and the control of Q1 is terminated. Owing to the storage time however Q1 continues to be conductive for a short period. At the beginning of the Q2 control, C2 has already been charged to such an extent that pulse width modulator 2 is no longer inhibited. However, the voltage level $V_{R2}$ for V1 is reached also during the conductive period of Q2, and C2 is discharged, too, so that the control pulse on line 3 is terminated. The maximum current $I_L$ through load L is reached by the regulator when both switching transistors are controlled with the maximum pulse width, and when the current flowing through each transistor reaches critical value $I_c$ precisely at the end of the switching cycle.

Case (c)

The circuit of FIG. 2 shows that the current flowing through the primary winding of transformer TR increases with the decreasing of the impedance at the secondary side of the transformer. On the other hand, the control loop attempts to balance a reduction of voltage $V_L$ by widening the driver pulses for the two switching transistors. This means that in case of a short circuit at the output terminals a very high current would flow through the primary winding of the transformer.

For the present case (c) it is assumed that there is no short circuit, but that the resistance of load L is still further decreased. As explained already in connection with FIG. 3 (b), protective circuit 12 switches off pulse width modulator 2 when a current amplitude is reached for which V1 equals reference voltage $V_{R2}$, so that the driver pulse is terminated immediately. Owing to the storage time however Q1 continues to be conductive during time $t_S$ depicted in FIG. 3. Q2, too, is at first switched on in the next cycle, but almost immediately switched off again through the reaction of protective circuit 12.

In case (c) depicted in FIG. 3, the regulator is overloaded but the switching transistors are not yet destroyed. However, if the load resistance is substantially reduced, e.g. by a short circuit, the current pulses during each cycle would be increased still further by the respective transistor, and the transistors would finally be thermally destroyed.

In order to prevent such destruction, protective circuit 14 with delay effect is provided. It prevents the generation of driver pulses during a predetermined and selectable number of cycles.

Figure 4:
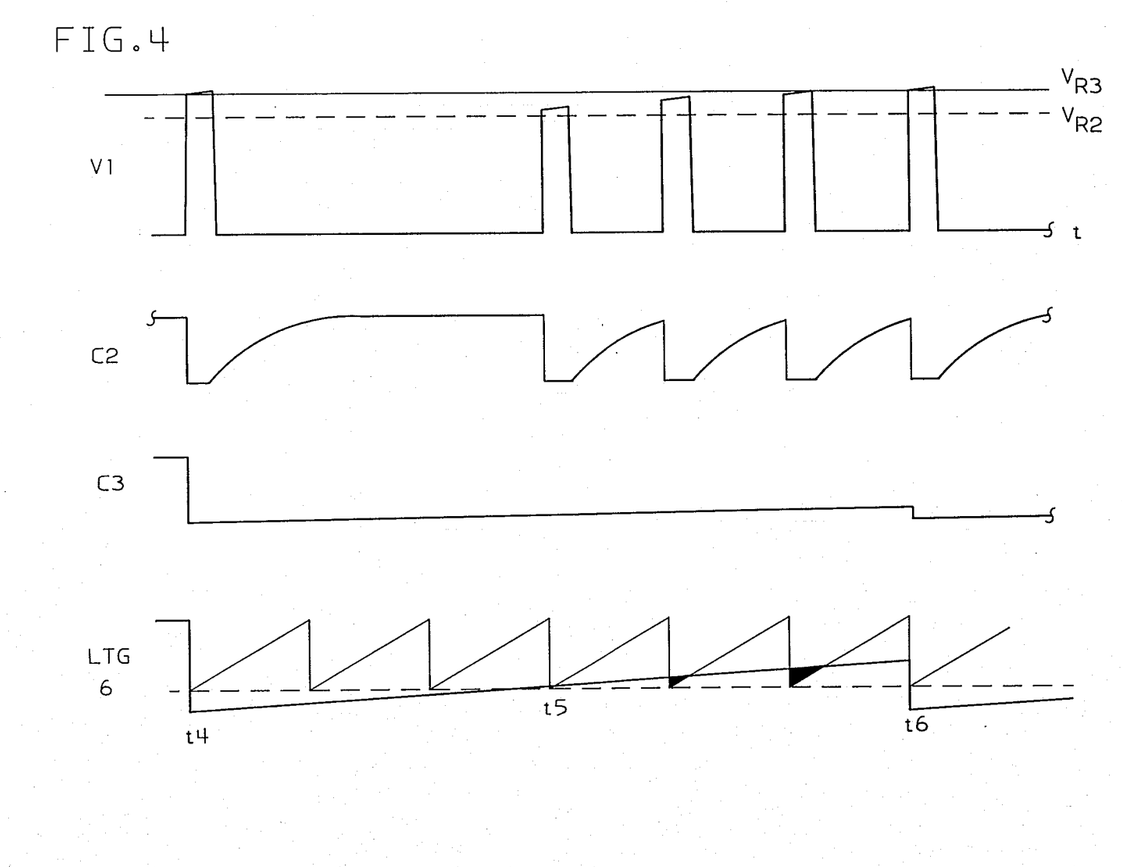
FIG. 4 represents, with reference to FIG. 2, the time development of various signals with an increased overload.

FIG. 4 also shows in its top line voltage V1, and the first pulse is assumed to reach the level of reference voltage $V_{R3}$. This applies when an increased overload current $I_D$ is reached by a switching transistor: $V_{R3} = R1 \cdot I_D$. The output potential of comparator 24 (FIG. 2) is thus controlled to ground potential, and capacitor C3 can discharge quickly. This is represented in the third line of FIG. 4 by the voltage jump at the extreme left (time t4). Via separating amplifier 28 which may effect a further small potential decrease in the negative direction, the zero potential at capacitor C3 is passed on to line 6, and completely inhibits pulse width modulator 2. As shown in the bottom line of FIG. 4, the potential on line 6 at time t4 is even below the triangle peak of the sawtooth supplied by oscillator 1. Since now none of transistors Q1 or Q2 is conductive, the outputs of comparators 22 and 26 turn again into the positive direction, and capacitors C2 and C3 can be recharged. Whereas C2 is recharged after a relatively short time, the charging of C3 is effected much more slowly owing to the greater time constant R3·C3. By selecting this time constant the moment of recovery of the power regulator after a short-term short circuit can be determined. The bottom line of FIG. 4 shows that owing to the slow charging of C3 after a predetermined period (time t5) a potential is reached again on line 6 which is higher than the bottom peaks of the sawtooth voltage so that pulse width modulator 2 can again emit control pulses which at first however are rather narrow. Following the delay time determined by time constant R3·C3 the power regulator starts operating again, and switching transistors Q1 and Q2 can again be rendered conductive. However, if the increased overload continues the emitter current pulses are again very narrow and strong so that after a relatively short period a status is reached in which voltage V1 again reaches the level of $V_{R3}$. This is shown in FIG. 4 at time t6. If there is a short circuit at the output of the power regulator, a re-start of the regulator does not immediately result in a switching-off, e.g. at time t5, since inductivity L has a delaying effect. In the bottom line of FIG. 4, black triangles are depicted in the sawteeth which increase with each sawtooth and generate driver pulses. For the sake of better understanding however the ratios in the bottom line of FIG. 4 are slightly exaggerated with respect to the voltage on line 6. In the actual line, the voltage on line 6 does not increase to the degree depicted in FIG. 4, but this exaggeration with respect to the scale does not affect the principle of the circuit.

Reference is now made to the effect of the feedback resistor $R_F$ of FIG. 2. According to FIG. 2, reference voltages $V_{R2}$ and $V_{R3}$ decrease upon a reduction of supply voltage $V_L$ by resistor $R_F$. As long as none of protective circuits 12 or 14 are activated, a decrease of $V_L$ is compensated by a broadening of the driver pulses. If however owing to an increased load on the supply voltage a decrease of $V_L$ and the attaining of the reference voltage $V_{R2}$ for both switching transistors coincide, i.e. if there is a very strong load at the output of the regulator, the reference voltage $V_{R2}$ in the subsequent cycles will be reached even sooner owing to the decreasing of its absolute value by means of the feedback resistor $R_F$, which in turn causes a further decrease of supply voltage $V_L$, etc. As specified above, a decrease of supply voltage $V_L$ can then not be balanced by the control device of the regulator when protective circuits 12, 14 respond. The respective lowest output potential of units 22, 26 and 5 determines the potential on line 6.

Figure 5:
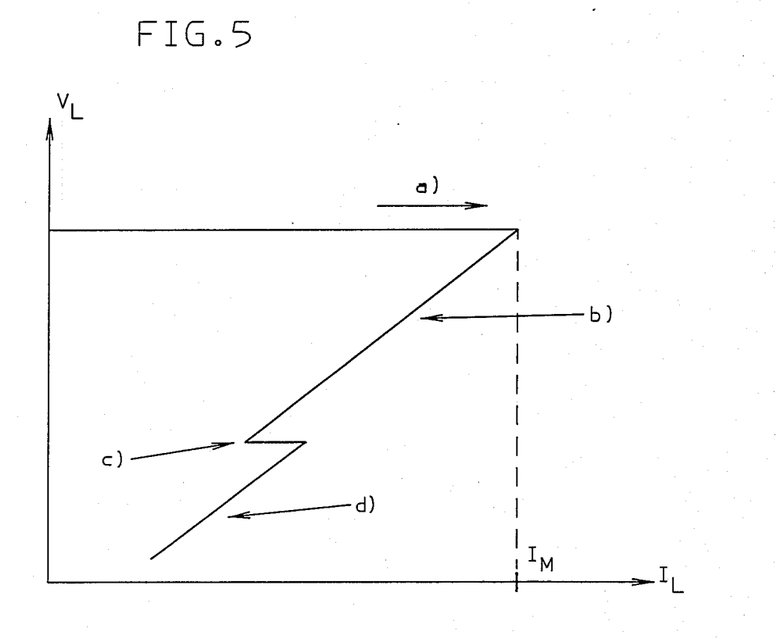
FIG. 5 represents a returning characteristic.

The characteristic of FIG. 5 represents first case (a), where with an increasing load current $I_L$ first rises, and one of the transistors is limited but not the other one. When the load at the output of the regulator is increased, the emitter current of the other transistor, or of both transistors increases until there occurs case (b) of FIG. 3 at current value $I_M$ through L. Due to the above described feedback of supply voltage $V_L$ to reference voltages $V_{R2}$ and $V_{R3}$, a returning branch (b) is now obtained in the characteristic according to FIG. 5, which with increasing load continues until a salient point characterized by the reaching of case (c). As shown in FIG. 4, the emitter current can then increase again to small extent (see FIG. 4 right-hand upper corner) until protective circuit 14 becomes active with delay effect, which is depicted in FIG. 5 by returning branch (d).

Some characteristic values for the circuit of FIG. 2:

| | |
|---|---|
| R1 | 50 milli Ohm |
| R2 | 11 kΩ |
| R3 | 20 kΩ |
| C2 | 1 nF |
| C3 | 8.2 μF |
| V1 | 48 V |
| +V | 5 V |
| $V_L$ | 5 V |
| $V_{R2}$ | 0.914 V |
| $V_{R3}$ | 0.951 V |
| $I_M$ | 66 A |
| oscillator frequency | 100 mcps |

Figure 6:
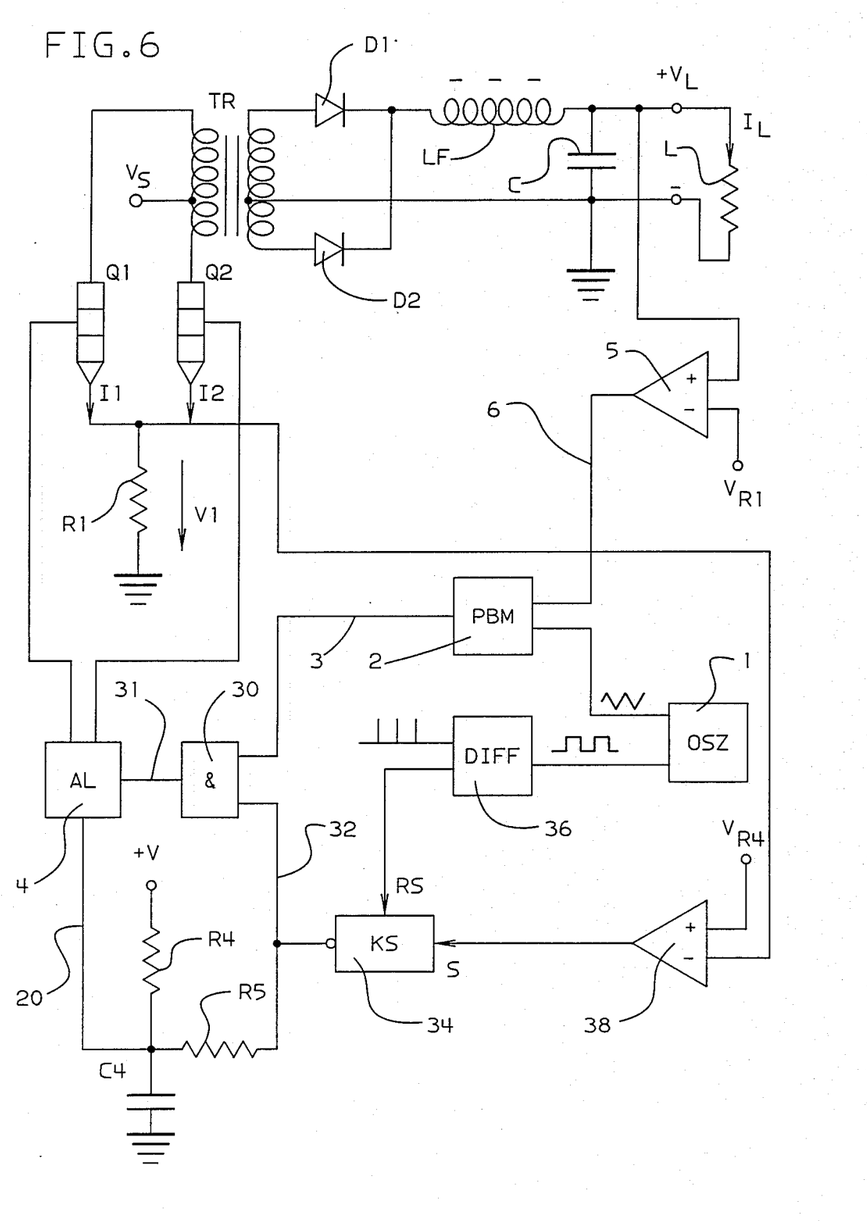
FIG. 6 represents a second embodiment of the protective circuit.
Figure 7:
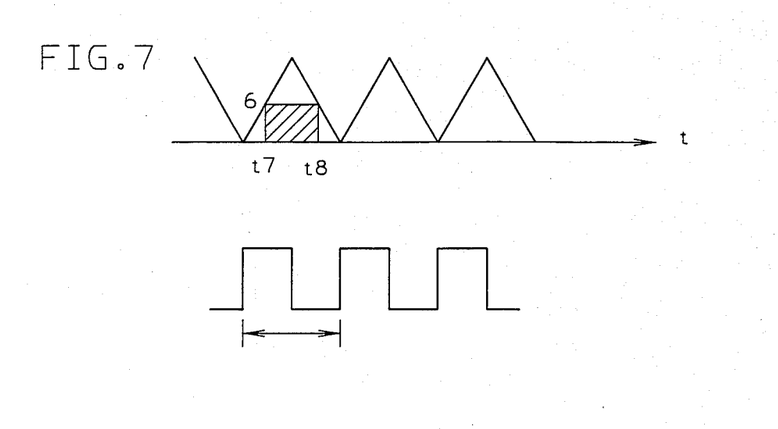
FIG. 7 represents the time development of various control signals.

With reference to FIGS. 6 and 7, a second embodiment of the invention will now be described. In FIG. 6, units corresponding to the same units in FIG. 2 are given the same reference numbers. As pointed out above, oscillator 1 can supply triangular or sawtooth voltages. FIGS. 6 and 7 represent a mode of operation using triangle voltages. In connection therewith, supply voltage $V_L$ is applied this time to the non-inverting input of operational amplifier 5, and reference voltage $V_{R1}$ to the inverting input. The control pulses generated by pulse width modulator 2 are applied to driver circuit 4 via an AND gate 30 and line 31. If there is no overload line 32 carries a positive signal, which e.g. when TTL logic is used can amount to +5 Volt. This signal is obtained by the inverting output of a flipflop 34 which if there is no overload is permanently in the reset state. Resetting takes place at the end of each control cycle by means of resetting pulses from a differentiating circuit 36 controlled by oscillator 1 with a rectangular voltage. The frequency of this rectangular voltage equals the frequency of the triangle voltage with which oscillator 1 controls pulse width modulator 2. If now during a cycle such a high current flows through one of the two switching transistors Q1 or Q2 that voltage V1 over resistor R1 equals, or is higher than, a reference voltage $V_{R4}$ which as a matter of fact can equal the reference voltage $V_{R2}$ of FIG. 2, the output signal of operational amplifier 38 travels in the positive direction, and sets flipflop 34 via input S. When setting flipflop 34, the output of this flipflop travels in the negative direction, e.g. to 0 Volt, and thus takes among the second logic input signal at AND gate 30. Consequently, the control pulses supplied by pulse width modulator 2 can no longer continue, and the driver pulse just generated at the output of driver circuit 4 is terminated immediately. With respect to this termination therefore the operation of the circuit of FIG. 6 corresponds to the effect depicted in FIG. 3 at times t1. At the end of the present control cycle, differentiating circuit 36 again supplies a resetting pulse, and flipflop 34 is thus reset again, and a positive output signal is generated at the inverting output. Thus, the control pulse supplied by pulse width modulator 2 can in the following switching cycle pass again on line 3 AND gate 30, and be applied to driver circuit 4 via line 31. Protective circuit 12 of FIG. 1 with delay effect comprises RC element R4·C4 in FIG. 6. As long as there is no current overload of the switching transistors, capacitor C4 is fully loaded (e.g. to +5 Volt). However, is there is an overload during a cycle, and if consequently flipflop circuit 34 is set, capacitor C4 can discharge via resistor R5 to the zero potential at the output of the flipflop. It is assumed that the discharge via R5 is faster than the loading of capacitor C4 via resistor R4. If now capacitor C4 is discharged pulsewise by flipflop 34 during several successive cycles, e.g. during 100 cycles, the voltage at capacitor C4 decreases to such an extent that driver circuit 4 is inhibited via line 20. Similarly to FIG. 4, left-hand side, no driver pulses are then generated any longer during a predetermined number of cycles, and thus capacitor C4 can again be charged via resistor R4 since flipflop 34 remains in the reset state and consequently supplies a positive signal at its output. A renewed start of the circuit part is thus made possible after a predetermined number of cycles. The duration of the delay effect results from the time constant R5·C4 and the discharge time (=setting state of 34) during its cycle. The re-start of the regulator can be controlled automatically or by a computer. Contrary to the circuit of FIG. 2, a decrease of supply voltage $V_L$ in the circuit of FIG. 6 is not realized following a returning characteristic. Furthermore, the circuit of FIG. 6 uses a flipflop and an RC element, whereas the effect of the protective circuit of FIG. 2 is based on two RC elements. The advantage of using a flipflop as well as binary logic signals is that the circuit of FIG. 6 is substantially independent of the tolerance of the components used.

FIG. 7 represents the triangle voltage and rectangular voltage generated by oscillator 1. If supply voltage $V_L$ is low compared with nominal value $V_{R1}$, i.e. if the error signal produced by operation amplifier 5 and applied on line 6 has a relatively low positive potential, FIG. 7 reveals that a relatively broad control pulse is generated between times t7 and t8, and that the voltage therefore rises. The more supply voltage $V_L$ then approaches reference voltage $V_{R1}$, the higher the positive value of the error signal on line 6, and the shorter the control pulses generated by puse width modulator 2.

What is claimed is:

1. A push-pull power regulator, with the output voltage being kept constant through pulse-width control of the drive pulses for two push-pull operated regulator switching transistors and with a protective system to protect the switching transistors against current overload, characterized in that said protective system includes a first protective circuit with immediate but short duration effect with instant switching-off of a switching transistor driver pulse in the event of an overload occurring due to a critical current value being reached by the switching transistor currently being activated, said short duration being within a switching cycle and a second protective circuit with immediate but long duration delay effect with instant switching-off of the switching transistor drive pulse and with a recovery only after several switching cycles to prevent for a longer but measured the time generation of further drive pulses after the appearance of an increased overload, and in that the input of said protective system is directly connected to the respectively conductive switching transistor so as to be directly controlled by the emitter current flowing through the respectively conductive switching transistor.

2. Power regulator as claimed in claim, 1 characterized in that the protective circuit with immediate effect comprises a first comparator whose non-inverting input is connected to a first reference voltage $V_{R2}$, and whose inverting input is connected to a common point of connection of the emitters of said two switching transistors, this point of connection being connected to ground potential via a common emitter resistor R1, the output of said first comparator being connected via a separating amplifier to a control input of the pulse width modulator of the power regulator, and said output of said first comparator being also connected to ground potential via a first capacitor and via a first resistor to a voltage source, the time constant of this first capacitor-first resistor RC element approximately equalling the period duration of a switching cycle, the value of $V_{R2}$ equaling R1·$I_c$, wherein $I_c$ is a critical current for said switching transistors.

3. Power regulator as claimed in claim, 1 characterized in that the protective circuit with delay effect comprises a second comparator whose non-inverting input is connected to a second reference voltage $V_{R3}$, whose inverting input is connected to a common point of connection of the emitters of said two switching transistors, this point of connection being furthermore connected to ground via a common emitter resistor $R_1$, whose output is connected via a separating amplifier to a control input of the pulse width modulator of the power regulator, and whose output is furthermore connected via a second capacitor to ground, and via a second resistor to a voltage source, the time constant of this second capacitor-second resistor RC element being substantially greater than the duration of a switching cycle period, and the protective circuit responding at current value $I_D=V_{R3}/R1$ increased relative to said critical current value.

4. Power regulator as claimed in any one of claims 2 or 3, characterized in that the threshold values for the critical current value and the increased current value are settable separately.

5. Power regulator as claimed in claim 2, characterized in that the first and second reference voltages are obtained from a constant voltage by means of a voltage divider consisting of three resistors, and that the output terminal of the power regulator receiving the supply output voltage is connected via a feedback resistor to the point of connection between the first voltage divider resistor connected to the constant voltage, and the second voltage divider resistor, the second reference voltage being also supplied at this point of connection, and the other end of the second resistor being connected to ground via the third resistor supplying the first reference voltage, in such a manner that if the load is further increased after the critical current value has been reached a returning voltage/current characteristic is obtained at the output of the power regulator.

6. Power regulator as claimed in claim 1, characterized by an AND gate conducting the pulse width modulated pulses to a driver circuit in order to produce the driver pulses for said two switching transistors, by a flipflop which at the end of each switching cycle is placed into a first state in which it switches through the AND gate, and by an operational amplifier comparing the voltage drop of the emitter currents of said two switching transistors over a common emitter resistor with a third reference voltage, and whose output signal places the flipflop into a second state switching off the AND gate when the third reference voltage is exceeded.

7. Power regulator as claimed in claim 6, characterized in that the output of the flipflop is connected via a third resistor to a control input of the driver circuit, and that this input is connected via a third capacitor to ground, and via a fourth resistor to a voltage source, the time constant of this RC element being high compared with the duration of a switching cycle period, in such a manner that upon a repeated switching of the flipflop in directly successive control cycles into the second state, the third capacitor is discharged, and thus via the control input the driver circuit is switched off, i.e. the generation of further driver pulses is prevented.

8. Power regulator as claimed in claim 7, characterized in that the threshold for the responding of the protective circuit with delay effect is selectable by selecting the time constant value of the RC element with the third capacitor and the third resistor.

9. Power regulator as claimed in claim 1, characterized in that the prevention of the generation of further driver pulses is limited with respect to time, and that the circuit is subsequently started again automatically.

* * * * *